United States Patent [19]
Morcos

[11] 3,844,053
[45] Oct. 29, 1974

[54] ARITHMETIC EDUCATIONAL TOY
[76] Inventor: George A. Morcos, 100 Beckwith Pl., Rutherford, N.J. 07070
[22] Filed: July 23, 1973
[21] Appl. No.: 382,025

Related U.S. Application Data
[63] Continuation-in-part of Ser. No. 269,478, July 6, 1972, abandoned.

[52] U.S. Cl. ............................................. 35/31 R
[51] Int. Cl. ......................................... G09b 19/02
[58] Field of Search .......... 35/31 R, 31 C, 31 A, 32, 35/30

[56] References Cited
UNITED STATES PATENTS
2,624,126 1/1953 Bolognino et al. ................. 35/31 A
3,226,533 12/1965 Beers ............................ 35/31 C X
3,571,950 3/1971 Walker ............................. 35/31 C Primary Examiner—Wm. H. Grieb
Attorney, Agent, or Firm—Mel K. Silverman

[57] ABSTRACT

An arithmetic educational toy intended to teach a preschool aged child the process of addition and the meaning of numerical sequence and magnitude, comprising: a housing; a plurality of display windows set within said housing; and means for the simultaneous symbolic and numeric display of each of the numbers to be added, the magnitude of the numeric display of each one of the numbers to be added being directly proportional to the physical length of said symbolic display of each one of said numbers to be added, wherein the visual output of said display means appears in said plurality of display windows.

15 Claims, 13 Drawing Figures

OUTER CYLINDER SHIELD, READING, "ADDENS" IN COLOR "A"

CENTRAL CYLINDRICAL DRUM, READING "TOTALS" IN COLOR "C"
(DRIVEN INDEPENDENTLY) DISPLAY INCREMENTS

INNER CYLINDRICAL DRUM, READING "INCREMENTS" IN COLOR "B"
(DRIVEN SIMULTANEOUSLY WITH OUTER CYLINDER)

ASSEMBLED DRUM BEHIND READING WINDOW

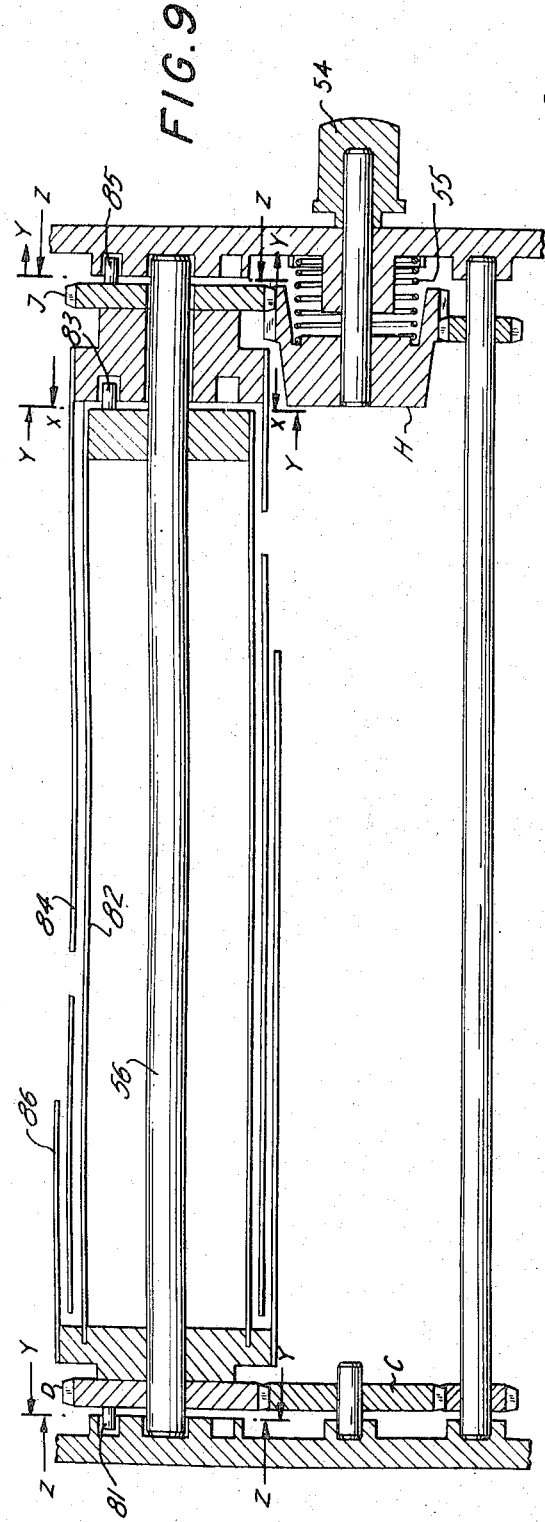
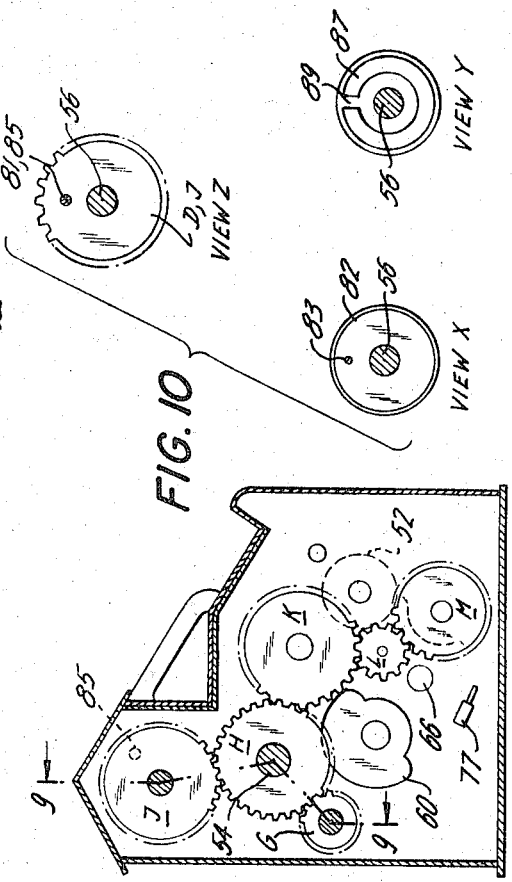
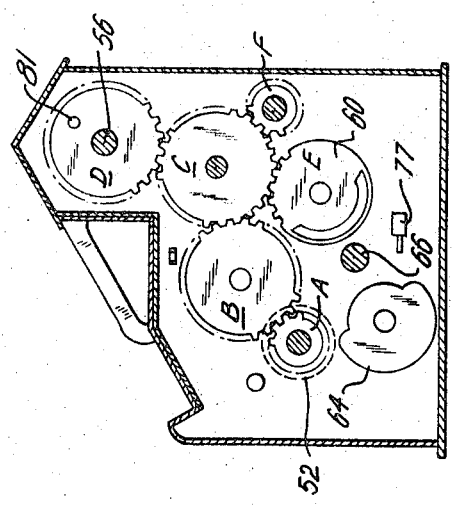

3,844,053

ARITHMETIC EDUCATIONAL TOY

PRIOR APPLICATION

This application is a continuation-in-part of Ser. No. 269,478, filed July 6, 1972 now abandoned. Specific reference to said application is made pursuant to 35 U.S.C. 120.

BACKGROUND OF THE INVENTION

The present invention relates to educational toys and more particularly to an arithmetic educational toy intended to teach a pre-school aged child the meaning and process of addition.

The present invention seeks to provide a method of arithmetic education that will retain the child's attention, provide him with a necessary degree of entertainment, and yet successfully introduce him to several important mathematical concepts.

SUMMARY OF THE INVENTION

An object of the present invention is to provide an educational toy intended to teach a child how to add.

Another object is to provide a toy of the above type that will teach a child to relate particular numerals to their respective magnitudes.

A yet further object is to provide a toy of the above type that will teach the child the meaning of numerical sequence.

A yet further object is to provide a toy that will introduce the child to the concept of the metric system.

The instant invention comprises: a housing; a plurality of display windows set within said housing; and means for the simultaneous symbolic and numeric display of each of the numbers to be added, wherein the visual output of said display means appears in said plurality of display windows.

BRIEF DESCRIPTION OF THE DRAWINGS

FIG. 7 is a detailed end-view of the left-hand side of the gear train.

FIG. 8 is a detailed end-view of the right-hand side of the gear train.

FIG. 9 is a longitudinal cross-sectional view of the present invention taken along line 9—9 of FIG. 8.

FIG. 10 comprises three cross-sectional axial views taken along lines z—z, x—x, and y—y respectively of FIG. 9.

DETAILED DESCRIPTION OF THE INVENTION

Figure 1:
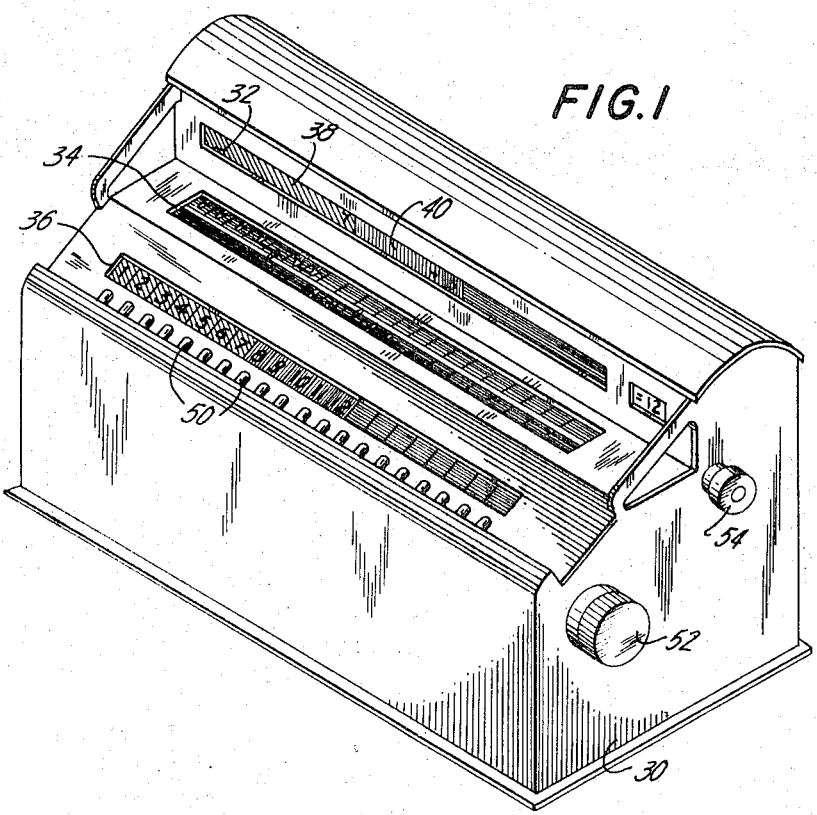
FIG. 1 is a perspective view of the housing and display windows of the present invention.

The present invention is held within a housing 30, see FIG. 1. Inasmuch as the housing may assume a variety of forms, the particular shape shown in FIG. 1 is to be taken as merely illustrative of one of numerous possible housing designs that would be suitable for the present purpose. FIG. 1 also illustrates three display windows 32, 34, and 36 respectively. These windows are shown in greater detail in FIG. 6. Window 32 displays the two numbers to be added. The numbers appear at the ends of segments 38 and 40 of the length of the window 32. Each segment is proportional in length to the number that appears at the end of the segment. Consequently, a child using the instant device can readily appreciate the relationship between a particular integer and its physical magnitude.

Figure 6:
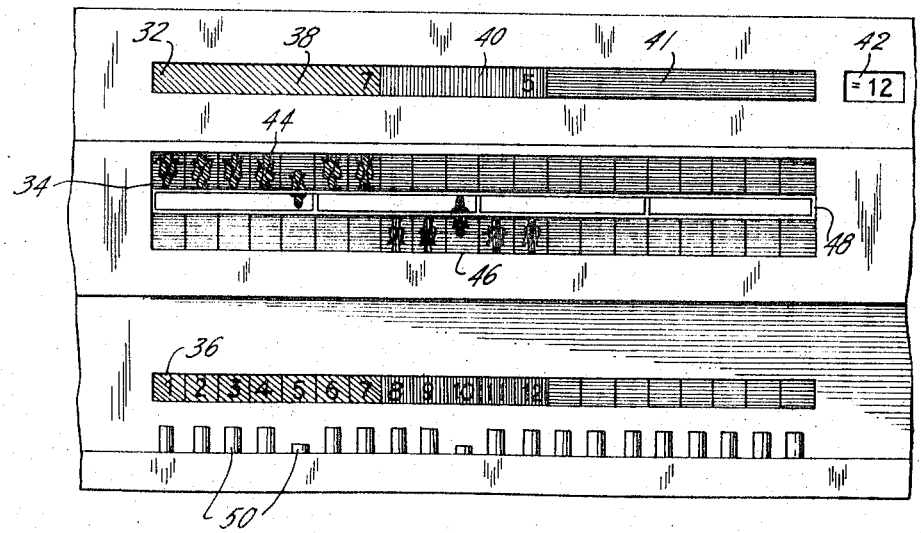
FIG. 6 is an enlarged plan view of the symbolic-numerical display windows.

The first of the two numbers in window 32 is termed an adden. The second number is termed an increment. In FIG. 6 the adden is 7, while the increment is 5.

The adden segment 38 of each window exhibits a color "A" which is represented as green in FIG. 6. The increment segment 40 exhibits a color "B" which is represented as red. The remaining segment 41 of window 32 is represented in a color "C." The total window is designated by element 42.

The second window 34 shows two groups of figurines 44 and 46 corresponding in both number and color to the addens and increments respectively. The two groups are separated from each other by a physical barrier such as a trough 48. The barrier is divided at three points into lenths equal to the width of five figurines. These separations are helpful to the child not only in teaching him to add more quickly, but also as an indirect aid in his learning of the metric system.

The third window 36 illustrates consecutive numbers up to the sum shown in the total window 42. These numbers are colored to correspond with the colors of both their respective figurines, and adden or increment segment.

Twenty push-buttons 50 are disposed proximate to the numbers appearing in window 36. By pressing down any of the buttons, the corresponding figurine is displaced into the center trough 48. FIG. 6 shows integers 5 and 10 actuated. Note that the push-buttons located to the right of the sequence of numbers displayed are locked, so that the figurines in positions 13 through 20 cannot be actuated. Through the use of the push-buttons a child can learn the meaning of numerical sequence. Furthermore, his excitement in watching the figurines bobbing into the trough 48 will be sufficient to retain his attention.

The adden and increment adjustments are made as follows: one adden control disc 52 is located on each side of the toy. By turning either side of disc 52, the child can change the adden setting. With any such change, the increments are cooperatively displaced to the right in order to follow the addens. The color exchange of the figurines in window 34 and of the numerals in windows 32 and 36, occur simultaneously as the disc 52 is turned. The value of the increments will remain unchanged for any selected value of the addens. Stop pins mounted on the cylinders (to be discussed below) displaying the numbers and their sum, limit the rotation of the adden control discs 52 in such a way so that the sum (in window 42) is always either positive or zero, and not in excess of 20.

Another set of discs, termed the increment control discs 54 (see FIG. 1) serve to vary the increments. Use of this disc is restricted to the parent through the use of a locking means that is beyond the skill of a preschool aged child to unlock. By pulling the disc 54 out and against a spring 55 (see FIG. 9), the gears driving the cylinder and cams controlling the addens are disengaged. Then, by rotating the disc 54 while it is pulled out, the increment setting can be changed as desired by the parent.

In addition, a means for generating a musical sound is connected to the toy's gears and actuated by the rotation thereof. Said means for generating a musical sound may comprise a number of vibrating reeds touching the teeth of gears F and G (see FIGS. 7 and 8). The reeds will vibrate upon the advance of each tooth in said gears, said advance occurring upon the rotation of disc 52. Also, a musical sound may be generated by the attachment of reeds to protrusions located on push-button actuating arms 80 (see FIG. 2). These reeds would be vibrated whenever one of the buttons 50 was depressed.

Figure 2:
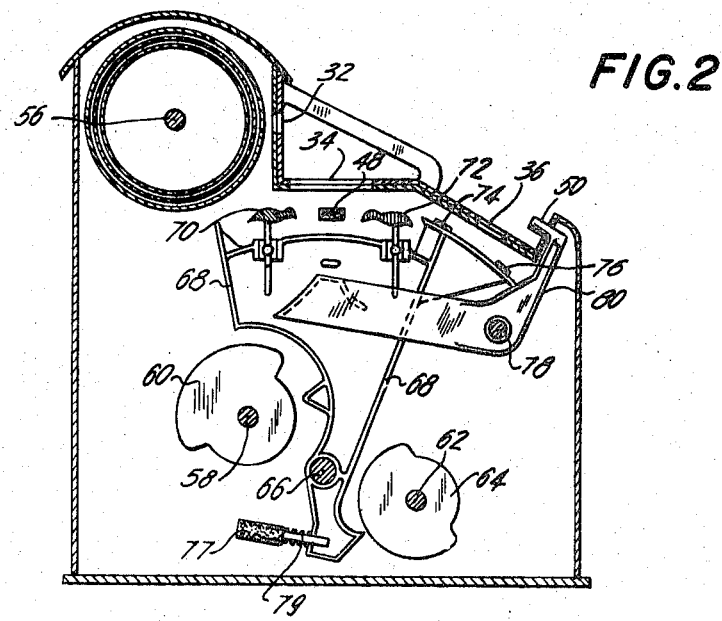
FIG. 2 is a cross sectional view of the invention's internal mechanism set in a first position, termed a neutral position.
Figure 3:
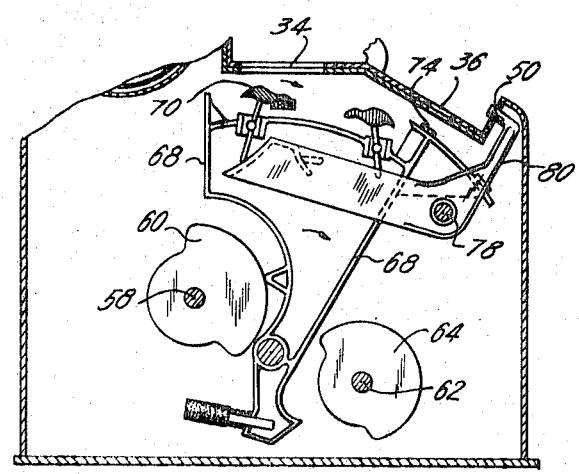
FIG. 3 is a cross sectional view of the invention's internal mechanism set in a second position, termed an adden position.
Figure 4:
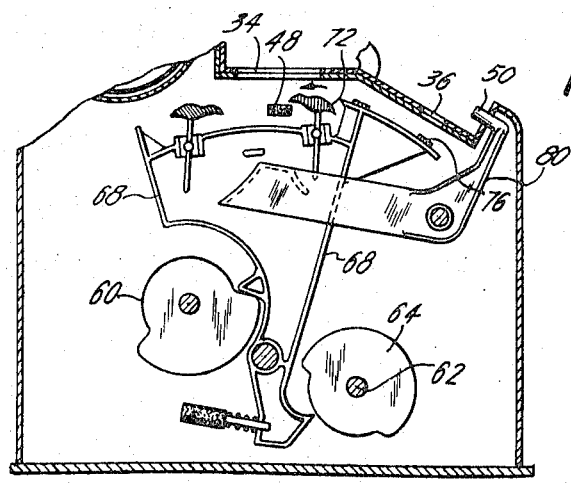
FIG. 4 is a cross sectional view of the invention's internal mechanism set in a third position, termed an increment position.

Turning now to the internal operation of the present invention, corresponding to each of the twenty integer display columns is a figurine and integer display system. This system is illustrated in cross section in FIGS. 2, 3, and 4. FIG. 2 represents a neutral position (no figurines displayed), FIG. 3 illustrates the adden display position, and FIG. 4 shows the increment display position. Those areas of FIGS. 2 – 4 shown in gray are fixed points.

Element 56 is a drive shaft on which three cylinders (further described below) displaying the integers that appear in window 32, are mounted. Element 58 is a pivot point for a first cam 60. Element 62 is a pivot point for a second cam 64. Element 66 is a pivot point for a figurine and integer carriage 68. Each of the twenty carriages 68 has both an adden figurine 70 and an increment figurine 72. Also, each carriage 68 is provided with an adden integer 74 and an increment integer 76. These integers are displayed in window 36. Whether the adden integer or the increment integer is displayed will depend on the status of the corresponding integer column.

Fixed point 77 serves as a base for a spring 79 which serves to bias the carriage 68. Also, element 78 is a pivot point for a push-button actuation arm 80. Referring now to FIGS. 3, 7 and 8, it is seen that the child's disc 52 is located on both sides of the gear train illustrated in FIGS. 7 and 8. A gear A is journaled about the rod which terminates in child's disc 52. Accordingly, disc 52 rotates gear A which rotates gear B which in turn drives gear C. Gear C in turn drives gear D which is connected to inner and outer cylinders 82 and 86 respectively. In addition gear C, drives gear E which is connected to adden cams 60. In its third function, gear C rotates gear F which transmits its rotation to gear G on the right-hand side of the apparatus (see FIG. 8).

Gear G in turn drives gear H which is connected to the parent's disc 54. Gear H drives gear J which is connected to the central cylindrical drum 84, and gear K which itself drives gear L. Gear L in turn drives gear M which is connected to increment cams 64. Gear H which is pushed inwards by the effect of a spring 55 associated with the disc 52 (see FIG. 9), has double width teeth which serve to engage gear J on its outer half-width of teeth and gear G on its inner half-width of teeth. When the disc 54 is pulled outwards, gear J is disengaged from gear H. The rotation of gear H, while in such an outward position, will drive gears J, K, L and M, while gears G, F, E, D, C, B and A remain stationary. Hence, only those gears which control the increment adjustment are affected. Releasing gear H, or the disc 54, will bring those gears that are associated with the increment control back into an inward position, thereby causing the entire gear train of FIGS. 7 and 8 to become interlocked.

The operation of the previously mentioned stop pins is shown in FIGS. 7, 8 and 9. There are a total of three stop pins: one on gear D which is labeled element 81, one on the right-hand end of inner cylindrical drum 82 which is labeled element 83, and a third on gear J which is denoted as element 85. All three pins engage similarly shaped grooves 87, as is illustrated by View Y of FIG. 10. Said grooves 87 include a stop barrier 89 to limit the travel of said pins. Further description of the function of said pins will follow in conjunction with discussion of the function of the cylindrical numerical matrices.

Referring now to FIG. 3, it is seen that as disc 52 is turned, a first gear train (shown in FIGS. 7 and 8 as comprising gears A, B, C, D, E, F and G) actuates successive first cams 60, with the number of said cams that are actuated being dependent upon the degree to which disc 52 is turned. When cam 60 is urged clockwise, as shown in the change from FIG. 2 to FIG. 3, the carriage 68 is pivoted about point 66 thereby causing the adden figurine 70 to appear in window 34, and the adden integer 74 to swing into view in display window 36. When the push-button 50 is pushed, the push-button actuation arm 80 pivots about point 78 causing the head of figurine 70 to be angularly displaced into the trough 48.

Said first gear train also actuates a second gear train (shown in FIG. 8 as comprising gears J, K, L and M) through the medium of common gears (shown as gear H in FIG. 8) that is associated with the drive shaft of the increment control disc 54. As said common gear is turned by said first gear train, successive second cams 64 are actuated. The number of said cams that are actuated is dependent on the degree to which said common gears are turned. The actuation of said cams 64 serves to (1) cooperatively advance the increment segment 40 to the right, (2) urge the increment (color B) figurines 72 into window 34, and (3) swing the increment integers 76 into window 36.

FIG. 4 illustrates the increment position of the cam 64, carriage 68, actuation arm 80, and figurine 72. The increment function is essentially analogous to the adden function: as the parent turns disc 54, the second gear train again actuates successive second cams 64, with the number of said cams that are actuated being dependent on the degree to which the disc 54 is turned. The actuation of said cams 64 urges the increment figurine 72 into window 34 and the increment integer 76 into window 36. Similarly, push-buttons 50 can be used to bob the head of figure 72 into the trough 48.

Figure 5A:
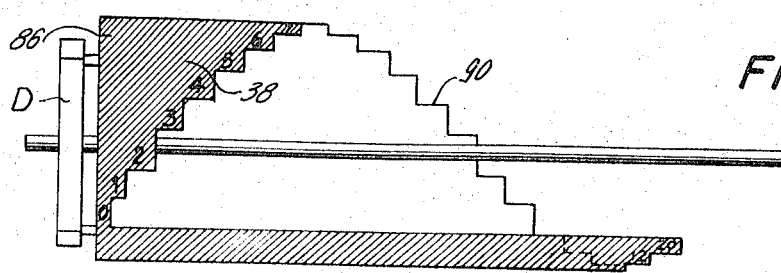
FIGS. 5a–5d are views of the invention's numeral display matrices.
Figure 5B:
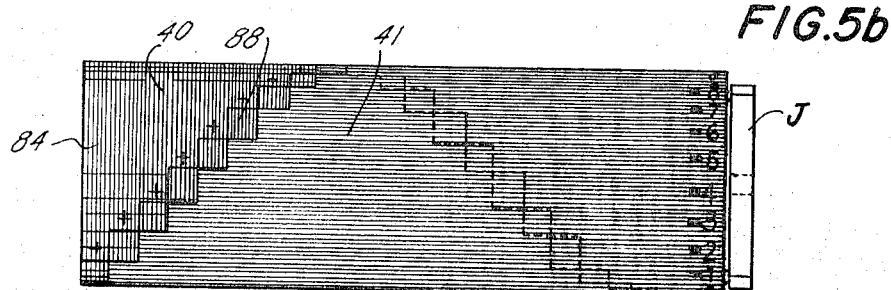
Figure 5C:
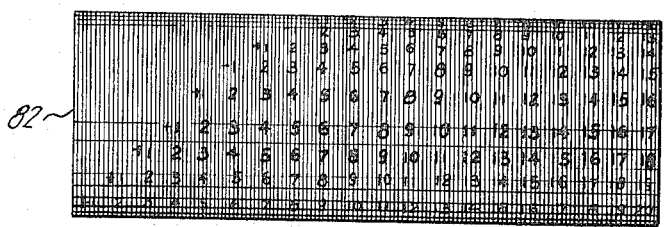
Figure 5D:
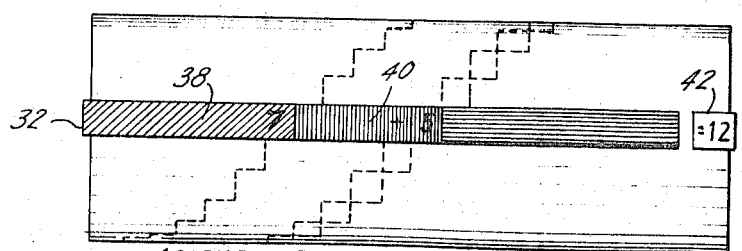

The remaining internal feature of the present invention is the mechanism that produces both the number-containing segments 38 and 40 (see FIG. 1) and the sum window 42. Said mechanism comprises an inner drum 82 (see FIG. 5c) having a matrix of integers printed thereon, an intermediate cylindrical shield 84 (see FIG. 5b) which surrounds said inner drum, and an outer shield 86 (see FIG. 5a) which surrounds said intermediate shield. The integers on the inner drum 82 are printed in red, or color B, and thus constitute the "increment matrix."

As the outer shield 86 is turned by disc 54, the segment 38 (corresponding both in length and notation to the respective integers) on the shield 86 will come into view in window 32. It is to be noted that the outer shield 86 is, during changes in adden setting, cooperatively engaged to the inner drum 82 so that the shield 86 and drum 82 maintain the same position respective to each other. The increment segments 40 are shifted to the right as the magnitude of an adden is increased. Windows 88 in the intermediate shield and a cut-away pattern 90 in the outer shield, allow the increment integers of drum 82 and their corresponding lengths 40 to appear in window 32.

In addition, the intermediate drum 84 is driven by the increment disc 54 when there is a change in the increment setting. With such changes in increment setting, the drum 84 adjusts the increment lengths 40. It is to be noted that drum 84 also displays the sums 42 and, of necessity, is rotatable by both discs 52 and 54.

At this point it is necessary to examine the interrelationship between the previously mentioned pins 81, 83, and 85 and the cylindrical matrices 82, 84, and 86. It may be seen in FIGS. 9 and 10 that the pin 81 on gear D limits the rotation of the outer shield 86 between the integer values of zero and 20. The pin 85 on gear J serves to limit the rotation of the central cylindrical drum between the increment values of zero and 20. A full-scale rotation would be expected were it not for the presence of the pin 83 which imposes two new limits on the rotation of the gear J. The location of said two limits is a function of the position of pin 81 on gear D. In other words, there are 21 possible positions for each cylindrical drum, i.e., from zero through 20.

The travel of the pins 81, 83 and 85 from the point where they hit one side of the barrier 89 to the point where they hit the other side of said barrier is 20/21sts of a full turn (see View Y of FIG. 10). When the outer shield is set in a zero adden position, the pin 81 is in contact with the barrier 89, thus preventing a reading of less than zero. The pin 83 on the inner drum 82 rotates with the pin 81 and, accordingly, is at a zero position at the same time as is pin 81.

When the central drum 84 is also set to read a zero increment, the pin 85 will be in contact with the barrier 89 which mates with gear J, thus preventing any further rotation in the negative direction. It is to be further noted that any rotation of the gear D with respect to the gear J will reduce the net allowable rotation of J by the amount of said rotation of gear D. Hence, the sum of the rotations of gears D and J cannot exceed a rotation corresponding to an integer reading of 20.

It is thus seen that the objects set forth in the Summary of the Invention are effeciently attained by the device of the preceding description.

I wish it to be understood that I do not desire to be limited to the exact detail of construction shown and described for obvious modification will occur to persons skilled in the art.

Having thus described my inventions, what I claim as new, useful and non-obvious, and hereby secure by Letters Patent of the United States is:

1. An arithmetic toy intended to teach a pre-school aged child the process of addition, and the meaning of numerical sequence and magnitude, comprising:
    a. a housing;
    b. a plurality of display windows set within said housing;
    c. means for the illustration of numbers to be added; and
    d. means for the simultaneous symbolic and numeric display of each of said numbers to be added, the magnitude of the numeric display of each one of said numbers to be added being directly proportional to the physical length of said symbolic display of each of said numbers to be added, wherein the visual output of said display means appears in said plurality of display windows.

2. The device as recited in claim 1 in which said means for symbolic and numeric display further includes means for sequential numeric display of a composite integer train comprising those illustrated integers up to and including an integer corresponding to the sum of the numbers to be added.

3. The device as recited in claim 1 in which said device further comprises means for selectively causing the physical perturbation of any of the composite integers of said symbolically displayed numbers, wherein said integers comprise any integer in an integer train of the numbers to be added, up to and including the integer that corresponds to the sum of the numbers to be added, whereby said physical perturbation will draw a child's attention to the perturbed integer.

4. The device as recited in claim 1 in which the output of said symbolic and numeric display includes a numerical display of the sum of the numbers added.

5. The device as recited in claim 4 in which said means for symbolic and numeric display further includes control means for changing the various numbers to be added.

6. The device as recited in claim 5 in which the numbers to be summed are limited to two.

7. The device as recited in claim 6 in which said plurality of display windows comprises: a first window in which both the physical magnitude and a numerical representation of each of the two numbers added appears; and a second window in which said symbolic representation of the numbers added appears.

8. The device as recited in claim 7 in which said plurality of display windows further comprises a third display window; and the output of said symbolic and numeric display means further comprises a sequential numeric representation of the composite integer train up to and including the integer that corresponds to the sum of the numbers added.

9. The device as recited in claim 8 in which said device further comprises means for selectively causing the physical perturbation of any of the composite integers of said symbolically displayed numbers, thereby attracting a child's attention to the perturbed integer.

10. The device as recited in claim 9 in which an actuation means of said perturbation means comprises a plurality of pushbuttons colinearly aligned with both the corresponding numerical representation and the symbolic representation of the integer to be perturbed.

11. The device as recited in claim 9 in which the visual output, in each of said three display windows, that is representative of the first of said two added numbers is displayed in a first color, and the second of said two added numbers is displayed in a first color, and the second of said two added numbers is displayed in a second color.

12. The device as recited in claim 11 in which said symbolic and numeric display means comprises a plurality of integer matrices printed upon a corresponding plurality of cylinders, whereby the visual display output appearing in said first window derives from the axial turning of said cylinders to any of a plurality of possible settings.

13. The device as recited in claim 12 in which said symbolic and numeric display means further comprises a plurality of cam and carriage mechanisms, said plurality being equal in number to the highest sum to which said device can add, each of said mechanisms corresponding to a particular integer, said mechanisms operatively driven in association with the turning of said cylinders, said mechanism including means for both the symbolic and sequential integer representation of the two added numbers, wherein said representations appear in said second and third windows respectively.

14. The device as recited in claim 13 in which said plurality of cam and carriage mechanisms further includes means for said two color representation of the added numbers.

15. The device as recited in claim 14 in which said plurality of cam and carriage mechanisms further includes means for causing the perturbation of particular integers.

* * * * *